United States Patent
Wang

(10) Patent No.: US 10,230,710 B2
(45) Date of Patent: Mar. 12, 2019

(54) TOKEN BASED NETWORK SERVICE AMONG IOT APPLICATIONS

(71) Applicant: Visa International Service Association, San Francisco, CA (US)

(72) Inventor: Quan Wang, Foster City, CA (US)

(73) Assignee: Visa International Service Association, San Francisco, CA (US)

(*) Notice: Subject to any disclaimer, the term of this patent is extended or adjusted under 35 U.S.C. 154(b) by 119 days.

(21) Appl. No.: 15/229,041

(22) Filed: Aug. 4, 2016

(65) Prior Publication Data

US 2018/0041487 A1     Feb. 8, 2018

(51) Int. Cl.
*H04L 29/06* (2006.01)
*G06F 17/30* (2006.01)
(Continued)

(52) U.S. Cl.
CPC ........ *H04L 63/08* (2013.01); *G06F 17/30867* (2013.01); *H04L 61/103* (2013.01); *H04L 61/6059* (2013.01); *H04L 63/0807* (2013.01); *H04L 63/0815* (2013.01); *H04L 63/20* (2013.01); *H04W 12/06* (2013.01); *H04L 61/2038* (2013.01)

(58) Field of Classification Search
USPC ............ 726/1, 2, 21, 36; 713/150, 163, 181; 380/255, 264, 276
See application file for complete search history.

(56) References Cited

U.S. PATENT DOCUMENTS

2006/0123472 A1* 6/2006 Schmidt .................. G06F 21/41
                                                                    726/8
2007/0154016 A1* 7/2007 Nakhjiri .................. H04L 63/06
                                                                    380/270
(Continued)

FOREIGN PATENT DOCUMENTS

CN         101984706 A      3/2011
KR      1020120120955      11/2012

OTHER PUBLICATIONS

Desai, et al., "Semantic Gateway as Service Architecture for IoT Interoperability", Kno.e.sis Publications, 2015, 17 pages.
(Continued)

*Primary Examiner* — Sharif E Ullah
(74) *Attorney, Agent, or Firm* — Kilpatrick Townsend & Stockton LLP

(57) ABSTRACT

One embodiment of the invention is directed to a computer-implemented method comprising, receiving registration information for one or more application programming interfaces (APIs) at a registrar computer system associated with a federated network of computing devices. The method further comprises generating a unique address for each API included in the registration information. The method further comprises generating a token confirming the registration of the APIs where the token identifies a trust relationship within the federated network of computing devices. The method further comprises receiving a request for the token from another registrar computer system that includes a canonical address for a particular API of the one or more APIs. The method further comprises providing the token to establish a secure connection with the federated network of computing devices.

20 Claims, 5 Drawing Sheets

(51) Int. Cl.
*H04L 29/12* (2006.01)
*H04W 12/06* (2009.01)

(56) References Cited

U.S. PATENT DOCUMENTS

2015/0135277 A1* 5/2015 Vij ..................... H04L 63/0892
726/4
2016/0205106 A1* 7/2016 Yacoub ............... H04L 61/1511
726/28

OTHER PUBLICATIONS

Katusic, et al., "Universal Identification Scheme in Machine-to-Machine Systems", Faculty of Electrical Engineering and Computing, Department of Telecommunications, date unknown, 8 pages.
PCT/US2017/041863, "International Search Report and Written Opinion", dated Oct. 23, 2017, 15 pages.

* cited by examiner

TOKEN BASED NETWORK SERVICE AMONG IOT APPLICATIONS

CROSS-REFERENCES TO RELATED APPLICATIONS

None.

BACKGROUND

Advances in network technology and computer device technology allow for users to connect or communicate via the internet with a variety of devices. For example, a user may send images from their mobile phone to another user via the Internet. As another example, a user may place an order for milk via a user interface associated with their refrigerator. However, current solutions for providing a communication gateway support limited communication between similar technologies or devices (e.g., an application of a particular brand of smart phone can only communicate with the same application on another similar brand smart phone). Further, security vulnerabilities must be overcome and protocols established before communication can be allowed between devices that are not operating within the same network or have never established communication as trust relationships between devices must be formed. Currently, computing devices are unable to locate and/or communicate with other devices because an established communication protocol does not exist nor is there a way to proliferate the protocol and establish trust between devices. Moreover, computing devices attempting to communicate with other networks of computing devices may lack the information to locate or address said computing devices or associated applications running on the computing devices. These drawbacks may lead to frustration as users may wish to utilize their smart refrigerator to communicate with their TV or a TV belonging to another user. However, without an established communication protocol the devices will be unable to talk or communicate in a meaningful way that will be of use to a user.

Embodiments of the invention address these and other problems, individually and collectively.

BRIEF SUMMARY

Embodiments of the invention are directed to systems and methods related to establishing and proliferating a trust relationship among federated networks of computing devices and establishing a secure connection between devices associated with the federated networks of computing devices.

Current solutions lack a method for establishing trust between federated networks of computing devices and forming a trusted open network that allows for various voting structures to allow communication within the open network and to add new members to the open network. No protocol currently exists to provide a means for locating devices that wish to be communicated with or how to communicate with said devices. Currently, users must rely on a particular application being configured to communicate across devices and even then trust must may be limited to a few devices owned by a particular user. Thus, if a user wishes to communicate with a device that is not pre-configured for a particular application and/or not already trusted by their own federated network, the user is unable to perform the desired communication and interaction operations.

Thus, there is a need for new and enhanced systems and methods of establishing and proliferating a protocol for establishing trust between entities in an open network and establishing a hierarchical addressing scheme to allow communication between applications residing on various Internet of Things (IoT) devices.

One embodiment of the invention is directed to a computer-implemented method comprising, receiving, by a processor associated with a trust management system, a communication request from a first computing device of a first federated network of computing devices, where the communication request identifies a second computing device of a second federated network of computing devices. The computer-implemented method further comprises determining, by the processor, that the second federated network of computing devices is a trusted member of an open trust network based in part on input provided by a plurality of federated networks of the open trust network and the first federated network of computing devices. The computer-implemented method further comprises requesting, by the processor, a token from a first registrar associated with the first federated network of computing devices, the token including a unique application program interface (API) address associated with the first computing device. The computer-implemented method further comprises providing, by the processor, the token to a second registrar associated with the second federated network of computing devices and establishing a secure connection between the first computing device and the second computing device utilizing the token.

In some embodiments, the communication request identifies the second federated network of computing devices utilizing a canonical address format. In embodiments, a trusted member of the open trust network utilizes at least one of a block chain voting structure, a tree voting structure, or a hybrid voting structure. In some embodiments, each trusted member of the open trust network has a certain weighted vote to determine the trust of a particular federated network of computing devices.

In some embodiments, the communication request includes a query for an API for a particular program associated with the second computing device. In embodiments, the computer-implemented method further comprises adding the second federated network of computing devices to the open trust network.

One embodiment of the invention is directed to a computer-implemented method comprising receiving, by a registrar computer system associated with a federated network of computing devices, registration information for one or more APIs. The computer-implemented method further comprises generating, by the registrar computer system, a unique address for each API included in the registration information. The computer-implemented method further comprises generating, by the registrar computer system, a token confirming the registration of the one or more APIs, the token identifying a trust relationship within the federated network of computing devices. The computer-implemented method further comprises receiving, by the registrar computer system, a request for the token from another registrar computer system, the request including a canonical address for a particular API of the one or more APIs and, providing the token to establish a secure connection with the federated network of computing devices.

In some embodiments, the federated network of computing devices comprises one or more of a mobile computing device, a wearable device, a laptop computer, a desktop computer, a server computer, or an automobile. In embodiments, the computer-implemented method further comprises updating, by the registrar computer system, a mapping of tokens to a plurality of APIs associated with a plurality of federated networks of computing devices based in part on input provided by the plurality of federated networks of computing devices.

In some embodiments, the input identifies membership in an open trust network. In embodiments, the canonical address for the particular API includes an Internet Protocol version six (IPV6) address. In some embodiments, the canonical address for the particular API is determined based in part on hashing a local address associated with a computing device corresponding to the particular API. In embodiments, the request includes a unique transport address that is associated with the registrar computer system. In some embodiments, confirming the registration of the one or more programming interfaces includes utilizing a policy for authenticating a computing device associated with at least one of the one or more programming interfaces.

Embodiments of the invention are further directed to a server computer comprising a processor and memory. The memory can include instructions that, when executed with the processor, cause the server computer to perform operations for implementing any of the methods described herein.

These and other embodiments of the invention are described in further detail below.

DETAILED DESCRIPTION

Figure 1:
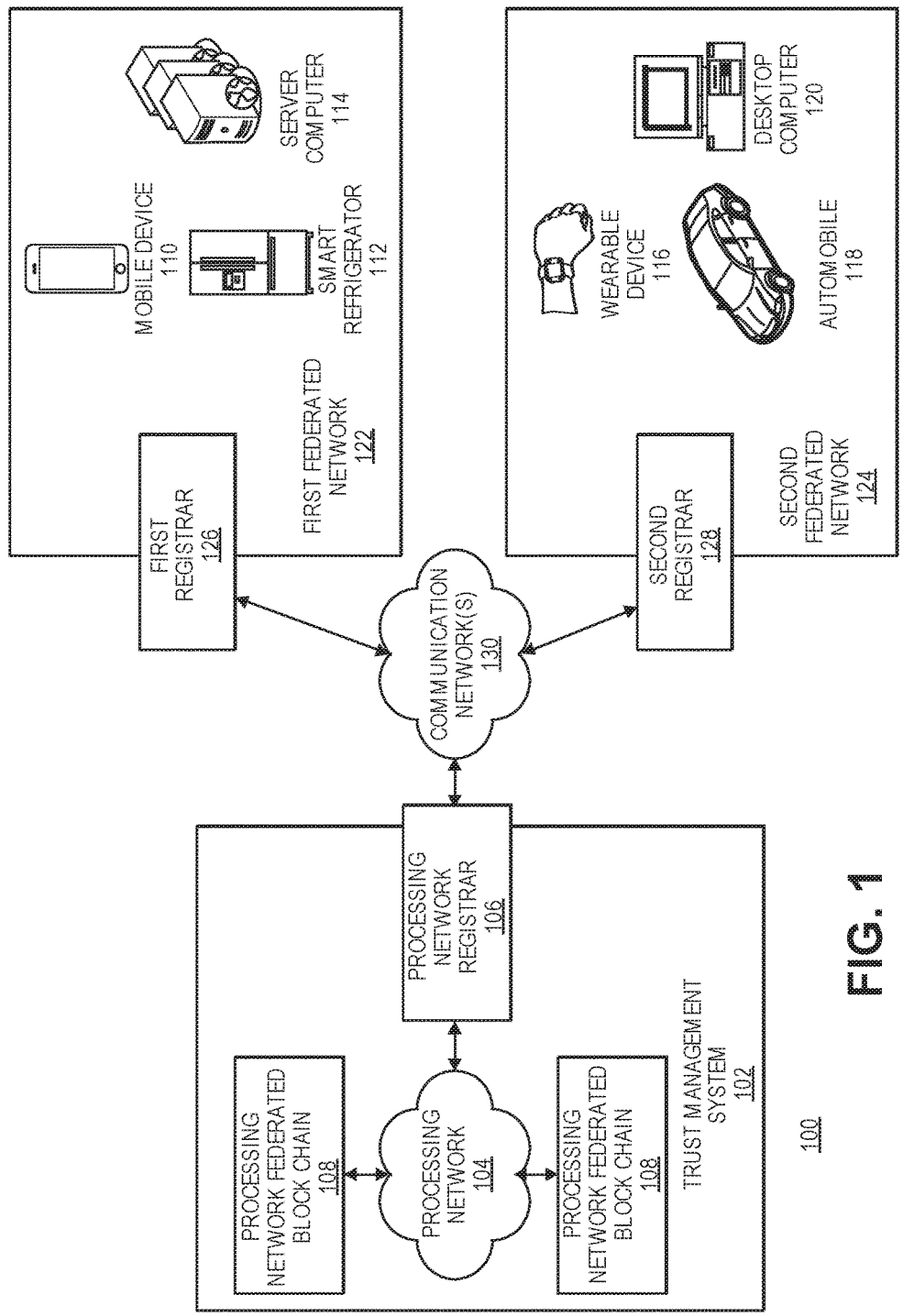
FIG. 1 depicts an example system architecture capable of implementing at least some embodiments of the current disclosure.

Embodiments of the present invention may be directed to systems and methods related to establishing and proliferating a trust relationship among federated networks of computing devices and establishing a secure connection between devices associated with the federated networks of computing devices.

In some embodiments, trust may be established between one or more federated networks of computing devices to allow an connection to be established between IoT devices residing in different networks. For example, an open trust network may be established that is managed by a trust management system for proliferating a protocol of trust establishment, signaling, and communication between the federated networks of computing devices. An IoT device residing in one federated network of computing devices may attempt to establish a connection to another IoT device residing in another federated network of computing devices by first establishing trust between the two federated networks of computing devices. In some embodiments, the IoT devices may send communication requests or other data communications via a registrar computer associated with each federated network of computing devices. Prior to allowing and enabling communication among IoT devices trust must be established. In embodiments, each federated network of computing devices may utilize a different voting structure to ratify or verify decisions, such as whether to trust a communication request from another device. Example voting structures may include a block chain voting structure, a tree voting structure, or any suitable hybrid of voting structures known in the art. In some embodiments, each IoT devices, user, or entity represented in each federated network of computing devices may provide input according to the utilized voting structure to establish trust in the open trust network.

In embodiments, voting and trust include verifying a credential or electronic identification (EID) for each entity included in a transaction or communication request. Multiple levels of trust may be established and verified before communications can occur between entities in the open trust network. For example, communication among IoT devices within a federated network of computer resources may occur upon verifying the signatures or "votes" associated with an EID or other credential communicated between IoT devices. As an illustrative example, a smart refrigerator may receive a communication request from a smart watch (wearable device) that are both included in the same federated network of computer resources. The smart refrigerator may communicate with an associated operator (such as the corresponding registrar) to query the identity and apply a policy that verifies and authenticates the communication from the smart watch. For example, the registrar may maintain or identify one or more signatures that are provided by other entities (i.e., IoT devices) within the federated network for the credential that was provide by the smart watch. Other IoT devices within the federated network of computer resources may have previously encountered and trusted the smart watch and enabled communication.

In embodiments, each signature or vote may carry a certain weight that factors into the overall determination of whether to authenticate and verify an entity and establish communication. The registrar may maintain one or more policies for each IoT devices that establish a minimum signature or vote limit that must be met before communication can be established. For example, a policy may require that a credential have been previously signed by three other trusted entities within the federated network. Once trust has been established communication can occur between the IoT devices. Further, the registrar may update the credential or EID provided by the smart watch to indicate that the smart refrigerator has verified and signed the EID. Signatures discussed herein refer to utilizing a private key that is associated with each entity or IoT device.

In embodiments, an IoT device from a first federated network may attempt to communicate with an IoT device from a second federated network. As discussed herein, locating and communicating with IoT devices of different federated networks requires a hierarchical addressing schema that is maintained by a corresponding registrar. A hierarchical addressing schema may be utilized with an IPV6 header to avoid the flat addressing schema utilized in conventional blockchain configurations. Once a communication request has been received, similar operations as those discussed above to determine trust. In some embodiments, a registrar that receives a communication on behalf of an IoT device from another registrar may identify appropriate polices (i.e., identify a threshold amount of signatures) and query other entities in the open trust network (i.e., other registrars) to determine trust. For example, a given registrar may determine that a communication request from a particular federated network of computer resources must be trusted or signed by two bank organizations and one government organization before trust can be established. In embodiments, the registrar may identify the associated signatures of a provided EID via corresponding metadata or other suitable information for identifying private key signatures provided by entities. In various embodiments, a registrar may communicate with other registrars inquiring about the entity in question to determine trust.

For example, the registrar may query by providing the EID and requesting whether the entity has previously signed the EID. As discussed herein, each entity in the open trust network is given a weighted value or factor that is associated with their signing of a given EID. For example, a bank institution signature may carry greater weight in a trust determination than a signature provided by a private individual. Maintained policies may require a number of entities with a given weight value or factor provide votes or signatures for a given EID prior to establishing trust. Once trust has been established, a corresponding registrar may provide a token that includes addressing information that allows communication between IoT devices of different federated networks of computing devices. Further, the registrar may update a list of trusted entities, signatures provided to said entities, and contact information for a trusted federated network of computer resources. Signaling between IoT devices includes utilizing a hierarchical addressing scheme that maintains a unique address for each IoT device and associated applications without overloading or running out of available addresses, as discussed herein. In embodiments, a user of an IoT device may specify the votes or signatures required before an entity will be trusted.

In embodiments, each member of the open trust network may be queried before establishing trust between two federated networks of computing devices or, in some embodiments, only the federated network of computing devices receiving requests may vote to establish trust. Each participating entity in a trust establishment decision may be assigned a weight or be given a certain number of votes despite the voting structure utilized within each participating federated network of computing devices. For example, one federated network of computing devices includes five IoT devices that utilize a block chain voting structure can provide a single vote that is given a certain weight towards a decision as similarly as another federated network of computing devices that includes only three IoT devices that utilizes a hybrid voting structure. Part of establishing trust between federated networks that are geographically remote includes locating a particular federated network and knowing how to address or communicate with said federated network. Current solutions fail to provide a way for one type of IoT device (i.e., a smart refrigerator) to locate and/or communicate with another type IoT device (i.e., a smart car). For example, a particular type of IoT device may only be configured to communicate with other IoT devices of the same type (i.e., a smart car to smart car communication). Embodiments disclosed herein provide a distributed entity (registrar) associated with each federated network of computing devices that may serve as a signaling hub that allows for federated networks of computing devices to locate each other and communicate with each other (including trust establishment requests).

Each registrar may be located by other registrars utilizing a unique canonical address that is part of a hierarchical addressing scheme. In some embodiments, the hierarchical addressing scheme refers to one or more addresses that are associated with and utilized by a federated network of computing devices. For example, the unique canonical address may be a transport internet protocol address that may be utilized to communicate between registrars. In embodiments, a token may be generated by a registrar and provided to another registrar that includes other addressing information, such as a hashed device address or API address that corresponds to a particular IoT device of the federated network of computing devices or a particular application associated with the particular IoT device. In some embodiments, each IoT device and application may have a local address that is utilized when communicating within a federated network of computing devices. In embodiments, the registrar may generate and maintain a separate set of addresses for each IoT devices and application and mapping between the addresses for use by entities outside of their own federated network (i.e., addresses that can be utilized by IoT devices of another, remote, federated network of computing devices). The addresses that the registrar maintains and shares with other registrars may be generated by utilizing a private-public key pair or by utilizing a hashing process. Embodiments may utilize the hierarchical addressing scheme to maintain security and allow for a uniform protocol to be proliferated and established between members of the open trust network. For example, the addresses maintained by the registrar may adhere to a particular set of rules or policies that is uniform across members of the open trust network to ensure that a particular IoT device can properly address and request communication across federated networks of computing devices.

In some embodiments, the trust establishment and communication process may be initiated by a user conducting a transaction in a particular environment for an item or service. In some embodiments, the process may be initiated by a user seeking to gain access to secure data or a secure area.

Embodiments of the present disclosure provide several advantages. As discussed herein, currently there exists no established protocol for properly locating, addressing, and establishing trust between federated networks of computing devices that are comprised of computing devices or IoT devices. Further, federated networks do not have to update their voting structure to align with other entities voting structures as registrars can be utilized to communicate among federated networks that utilize different voting structures. Applications and devices that previously were unable to communicate let alone locate each other can now utilize the established protocol of communication via the registrar and hierarchical addressing scheme. Developers for IoT devices may only need to leverage API calls or requests according to the hierarchical addressing scheme to communicate and share data between IoT devices rather than maintaining a plurality of different addresses and communication methods to talk between IoT devices and applications. Security benefits may be gained as the hierarchical addressing scheme and trust establishment allows communication to the address maintained by each registrar and only after trust has been established thus one entity may fail to obtain an actual device or network identifier. As such, implementation of the invention described herein may include advantages for the use of networking, software, and hardware capabilities of existing network and computer devices with minimal infrastructure modification.

Embodiments of the present invention may be used in transaction processing systems or may use data generated during transaction processing through a transaction processing system. Such embodiments may involve transactions between users and resource providers. Further, embodiments of the invention, as discussed herein, may be described as pertaining to financial transactions and payment systems. However, embodiments of the invention can also be used in other systems. For example, a transaction may be authorized for secure access of data or to a secure area. Embodiments of the present invention may be used in establishing a connection or communicating between IoT devices residing in different networks and/or federated networks. The different networks and/or federated networks may be geographically remote.

Prior to discussing embodiments of the invention, descriptions of some terms may be helpful in understanding embodiments of the invention.

A "computer device" may comprise any suitable electronic device that may be operated by a user, which may also provide remote communication capabilities to a network. An "Internet of Things device" may be an example of a "computer device." An Internet of Things device may have a primary function that is unrelated to communicating with other Internet of Things devices or computers. For example, an Internet of Things device may be a refrigerator that, in addition to preserving food, is capable of interacting with one or more other Internet of Things devices. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of computer devices include mobile phones (e.g. cellular phones), PDAs, tablet computers, net books, laptop computers, personal music players, hand-held specialized readers, etc. Further examples of computer devices include wearable devices, such as smart watches, fitness bands, ankle bracelets, rings, earrings, etc., as well as automobiles with remote communication capabilities. In some embodiments, a computer device can function as a payment device (e.g., a computer device can store and be able to transmit payment credentials for a transaction). A "federated network of computing devices" may include one or more computer devices or Internet of Things devices that belong to a same network, entity, organization, or user. Each federated network of computing devices may utilize a voting scheme or structure.

A "registrar" or "registrar computer" may include computer hardware, software, or any suitable combination of both hardware and software for generating, maintaining, proliferating, and establishing a communication protocol between federated networks of computing devices. The registrar may be distributed between the federated networks of computing devices and also provide remote communication capabilities to a network. In some embodiments, the registrar may include one or more modules for communicating with other registrars and generating tokens for establishing communication among IoT devices. In embodiments, the registrar may request generation of a token by a particular IoT in an associated federated network of computing devices. In some embodiments, the registrar may store and maintain a hierarchical address scheme for one or more Internet of Things devices that correspond to an associated federated network of computing devices. The registrar may generate and maintain one or more tokens that identify authenticated Internet of Things devices in an associated network as well as tokens provided by other registrars of the open trust network. In embodiments, the registrar may include a data structure for obtaining and maintaining the above mentioned information.

A "trust management system" may include a system that operates based at least in part on trust. It may include one or more server computers for enabling communication between registrars, updating registrars with new contact and device information, and proliferating a communication protocol that includes a hierarchical addressing scheme. In embodiments, the trust management system may include may data processing subsystems, networks, and operations used to support and deliver authorization services, exception file services, and clearing and settlement services associated with transaction processing. In some embodiments, the trust management system may maintain membership in the open trust network. In embodiments, the trust management system may provide communication requests, responses, and tokens to registrars within the open trust network.

An "open trust network" may include a network that operates based at least in part on trust and open membership. It may include one or members that may join the open trust network upon requesting membership without any membership requirements or limitations (i.e., only federated networks of smart phone devices may join). In embodiments, a "member" of the open trust network represents a federated network of computing devices. In some embodiments, to join the open trust network, a vote may be held among the members of the open trust network with certain weights assigned to each entity. The votes are compared to a threshold to determine acceptance to the open trust network. In some embodiments, no vote is required to become a member of the open trust network. Instead, any communication or request from a previously unknown entity (federated network of computing devices) or known entity may be put to a vote to determine trust and establish trust between the entities in question. Each member of the open trust network may utilize their own voting structure or scheme (blockchain, hybrid, etc.,) without modifying the voting structure of another member.

A "token" may be any data or portion of data used to provide information, such as unique address information, API information, location information, or registrar information. The token may be encrypted, digitally signed, or utilize any suitable security protocols to ensure privacy of information. In embodiments, the token may represent a container for information communicated between registrars in the open trust network and/or between Internet of Things devices that have established a secure connection (device and/or application information). In some embodiments, a token may be provided to an IoT device within a federated network of computing devices that includes a location identifier and API identifier upon registration with an associated registrar. A token may be generated by a registrar and provided to another registrar to enable communication between IoT devices residing in different federated networks of computing devices.

A "hierarchical addressing scheme" includes a canonical address format for each registrar in the open trust network that can be utilized to obtain other associated addresses from the registrar. In embodiments, a hierarchical addressing scheme may include a transport IP address that is associated with a registrar, a federated network address, a local IoT device identifier address, and an API identifier address. In embodiments, each IoT device, application, and federated network of computing devices may utilize the hierarchical addressing scheme and be assigned said addresses by the trust management system and/or an associated registrar.

An "access credential" may be any data or portion of data used to gain access to a particular resource. In some embodiments, an access credential may include payment account information or a token associated with the payment account information, a cryptogram, a digital certificate, etc. A "transaction code" may be an example of an access credential.

An "access device" can include a device that allows for communication with a remote computer, and can include a device that enables a user to make a payment to a merchant in exchange for goods or services. An access device can include hardware, software, or a combination thereof. Examples of access devices include point-of-sale (POS) terminals, mobile phones, tablet computers, laptop or desktop computers, user device computers, user devices, etc.

An "application" may be computer code or other data stored on a computer readable medium (e.g., memory element or secure element) that may be executable by a processor to complete a task. Examples of an application include a registrar communication application, a token application, or an API services application. An application may include a mobile application. An application may be designed to proliferate and establish a trust and communication protocol between federated networks of computing devices. An application may enable a user to initiate a transaction with a resource provider or merchant and authorize the transaction.

A "user" may include an individual. In some embodiments, a user may be associated with one or more personal accounts, computing devices, and/or mobile devices. The user may also be referred to as a cardholder, account holder, or consumer in some embodiments.

A "resource provider" may be an entity that can provide a resource such as goods, services, information, and/or access. Examples of resource providers include merchants, data providers, transit agencies, governmental entities, venue and dwelling operators, etc.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc.

An "issuer" may typically refer to a business entity (e.g., a bank) that maintains an account for a user. An issuer may also issue payment credentials stored on a user device, such as a cellular telephone, smart card, tablet, or laptop to the consumer.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "payment processing network" (e.g., VisaNet™) may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™ in particular, includes a VIP system (Visa Integrated Payments System) which processes authorization requests and a Base II system which performs clearing and settlement services. A payment processing network may be referred to as a processing network computer.

FIG. 1 depicts an example system architecture capable of implementing at least some embodiments of the current disclosure. Each of these systems and computers may be in operative communication with each other. For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the Internet), using any suitable communications protocol.

FIG. 1 depicts an open trust network 100 that includes a trust management system 102 for establishing, maintaining, and proliferating the open trust network 100 for federated networks of computing devices and communicating with associated registrars. The trust management system 102 may include a processing network 104 and a corresponding processing network registrar 106. In embodiments, processing network 104 may include data processing subsystems, networks, and operations used to support and deliver authorization services, exception file services, and clearing and settlement services. For example, IoT devices in federated networks of computing devices may be utilized by a user to conduct a transaction (i.e., purchase an item) and the processing network 104 may process such transactions including authentication, verification, and clearing and settlement services. In some embodiments, the processing network registrar 106 may maintain a mapping of canonical addresses (i.e., transport IP addresses) for each registrar that corresponds to a member of the open trust network 100. In embodiments, the processing network registrar 106 may generate and/or provide one or more tokens to corresponding registrars of federated networks of computing devices for establishing a secure connection between said parties. In embodiments, the trust management system 102 and processing network 104 may utilize or be one link in a block chain voting structure that includes one or more processing network federated block chains 108. As described herein, the voting structure utilized by the trust management system 102 is compatible with voting systems used by other members of the open trust network 100 (such as a tree voting structure). In embodiments, the trust management system 102 may be in communication with one or more resource provider computers (not pictured) for processing transactions via IoT devices.

FIG. 1 also includes a plurality of IoT devices 110-120, each representing a different type of IoT device (e.g., a wearable device 116 vs. a smart refrigerator 112). Although a plurality of IoT devices are illustrated in FIG. 1, embodiments disclosed herein may include more or fewer IoT devices. Users may interact with the IoT devices 110-120 to browse, search, and purchase items or services, or interact with a plurality of software applications associated with or provided by the IoT device. FIG. 1 depicts a first federated network of computing devices 122 and a second federated network of computing devices 124 each including one or more IoT devices (110-114 and 116-120, respectively). The first federated network of computing devices 122 includes a corresponding first registrar 126 and the second federated network of computing devices 124 includes a corresponding second registrar 128. Communication between each member (102, 122, and 124) may be achieved via one or more communication networks 130 such as the Internet. In embodiments, the first registrar 126 and the second registrar 128 may be software, hardware, or any suitable combination of both for enabling a distributed management and proliferation of a communication and trust protocol in the open trust network 100.

In embodiments, each registrar 126 and 128 may generate and maintain a hierarchical addressing scheme that includes a canonical address for communicating between each federated network of computing devices 122 and 124. For example, the first registrar 126 may include a transport IP that serves as the unique identifier for the first registrar 126 and can be invoked or queried by other registrars in the open trust network 100 to begin communication. The transport IP may adhere to a canonical address format to enable efficient communication between members of the open trust network 100. In embodiments, the registrars 126 and 128 may generate, assign, and maintain one or more addresses for each of their respective IoT devices (110-114 and 116-120). In embodiments, each IoT device may be generated and assigned a local device ID, and each corresponding application or API service of the IoT device may include an application ID. The registrars may adhere to the canonical address format when generating and assigning addresses for ease of communication between devices. For example, a query from smart refrigerator 112 to wearable device 116 may adhere to a particular addressing format to allow location and proper processing by the associated registrars 126 and 128. Current systems lack the capability to allow IoT devices of different and/or same types to communicate across networks of computing devices let alone locate each other. The registrars 126 and 128 may generate the addresses by utilizing a hashing procedure on an already known address such as a current device identifier or media access control address. In some embodiments, addresses may be generated by encrypting known addresses using a private-public key pair that is provided by the trust management system 102 to each member of the open trust network 100.

In some embodiments, each registrar 126 and 128 may authenticate each IoT device belonging to an associated federated network of computing devices (122 and 124). An authentication procedure may also take place when a new device is added to each federated network. The authentication process may include a registrar obtaining a device identifier and application and/or API services identifier for each device, communicating with the trust management system 102 and providing a generated token to verify authentication to the newly registered/added device. In some embodiments, each registrar may have one or more policies for verifying trust between devices within a federated network of computing devices. For example, one policy could indicate that a user verification or confirmation must be performed before a device can be added to the federated network and trusted (i.e., provided a token). Upon authenticating a device or adding a new device, the registrar (126 and 128) may generate new addresses according to the hierarchical addressing scheme and update a mapping of addresses for the corresponding devices of an associated federated network of computing devices (122 and 124). User verification or confirmation can include providing authentication information such as an answer to a challenge question, a password, a personal identification number (PIN), or a biometric sample.

In embodiments, a first IoT device from one federated network of computing devices (122) may attempt to communicate with another IoT device from another federated network of computing devices (124). For example, the smart refrigerator 112 may attempt to communicate with the wearable device 116 via communication networks 130. To begin establishing a secure connection and locating the wearable device 116, the associated registrars must communicate. First registrar 126 may communicate with second registrar 128 on behalf of smart refrigerator 112 in some embodiments. In still other embodiments, the IoT devices (112 and 116) may attempt to communicate directly. In embodiments, the second registrar 128 may determine that first registrar 126 (and associated IoT devices) is trusted by communicating with the trust management system 102. In some embodiments, the trust management system 102 may determine whether the first federated network of computing devices 122 is a member of the open trust network 100. In still other embodiments, the second registrar 128 may begin a voting procedure within its own federated network 124 to determine whether to trust the first federated network 122. As described herein, the second federated network 124 can utilize any suitable voting structure (i.e., block-chain, tree, or hybrid) to vote whether to trust the first federated network of computing devices 122.

In some embodiments, trust between federated networks of computing devices is determined based on a vote from each member of the open trust network 100. For example, trust management system 102, second federated network of computing device 124 and other members (i.e., other federated network of computing devices) may each utilize their own internal voting structures and cast a vote on whether to trust a member's communication or allow a new member. Each member of the open trust network 100 may be assigned a weight for their given vote which may affect the outcome of whatever decision is being voted on. In embodiments, the first registrar 126 may locate the second registrar 128 by verifying the existence of the location address for the second registrar 128 in its own storage and/or memory. In other embodiments, the first registrar 126 may be periodically updated with the location information for newly added members by the trust management system 102 or may query the trust management system 102 for location information. The trust management system 102 may establish and maintain one or more policies and thresholds for determining a vote required to trust a federated network of computing devices or to add a new member to the open trust network 100. Newly added member information and their location information (transport IP) may be periodically provided to the distributed registrars of the open trust network 100 by the trust management system 102.

Upon locating and establishing trust with the second registrar 128, the second registrar 128 may request a token from the wearable device 116. The token may contain information for properly communicating with the wearable device 116 according to the canonical addressing format described herein. In some embodiments, the token may contain other information such as requested information from an application, API calls, or API service requests from applications and APIs associated with wearable device 116. For example, after a secure connection has been established between IoT devices of different federated networks, one device may provide information regarding an application (such as transaction information or information provided by a user interacting with a particular application) utilizing a token. In some embodiments, the second registrar 128 may generate and provide the token with the requested or appropriate information to the first registrar 126. Thereafter, the first registrar 126 may provide the token to the smart refrigerator 112. With the proper addressing information obtained by the smart refrigerator 112, a secure connection may be established between the smart refrigerator 112 and the wearable device 116 utilizing the token. In some embodiments, the processing network registrar 106 and/or the trust management system may provide the token from the second registrar 128 to the first registrar 126 and establish the secure connection between the smart refrigerator 112 and wearable device 116 utilizing the token.

Embodiments of the present disclosure include technical advantages for communicating between previously untrusted and/or undetected IoT devices that belong to different federated networks of computing devices. For example, the registrars can serve as intermediaries that establish trust and obtain location information to allow communications to be securely establish. Prior to the present disclosure, IoT devices lacked the capability to communicate to other IoT devices of a different type let alone IoT devices that operate in other federated networks. Further, by utilizing the registrar a layer of privacy and protection is provided as the IoT devices can communicate utilizing the hierarchical addressing scheme maintained by the registrar (device ID and application ID) that obfuscate the true device ID and application information. As such, any fraudster that obtains the device ID and application ID of the hierarchical addressing scheme would be unable to perform any operations with the said device until it was a trusted member and could not directly address the IoT device as the actual addressing information is obscured.

In some embodiments, the communication request between IoT devices of different federated networks of computing devices may be initiated by a transaction utilizing one of the devices. In such use cases, the token may contain information such as account information, credit card numbers, bank account numbers, digital wallet references, other suitable information such as personal authentication information, a shipping address, and contact information. Information about one or more computer devices (device information) or a user may be obtained by the associated registrar during an enrollment or verification process as described above. Other information such as device identifiers, network identifiers, and global positioning satellite information may be obtained during such a procedure. In some embodiments, tokens generated and requested during communication requests may be further encrypted utilizing any suitable encryption method to ensure privacy of information between federated networks of computing devices.

In some embodiments, the trust management system 102 may maintain one or more thresholds for different types of transactions (such as a particular threshold for transactions involving currency and a different threshold for transactions involving access to data). The trust management system may utilize the different thresholds in transaction use cases to verify or a transaction between IoT devices. In embodiments where a payment transaction is occurring, the trust management system 102 may communicate with a resource provider computer and/or an issuer computer. The resource provider computer or the trust management system 102 may then generate an authorization request message which may request authorization for the desired transaction. The authorization request message may be received an issuer computer in communication with the trust management system 102. Either may determine that a user has an appropriate amount of funds to complete the transaction that involves a monetary amount. In embodiments, the trust management system 102 or an issuer computer in communication with the trust management system 102 may generate and provide an authorization response message to the resource provider computer.

The trust management system 102 and processing network registrar 106 may include a processor, memory, input/output devices, and a computer readable medium coupled to the processor. The computer readable medium may comprise code, executable by the processor for performing the functionality described herein. In some embodiments, the trust management system 102 and processing network registrar 106 may include applications (e.g., computer programs) stored in the memory and configured to retrieve, present, and send data across a communications network (e.g., the Internet).

The first registrar 126 and second registrar 128 may be comprised of various modules that may be embodied by computer code, residing on computer readable media. The first registrar 126 and second registrar 128 may include a processor and a computer readable medium coupled to the processor, the computer readable medium comprising code, executable by the processor for performing the functionality described herein.

The IoT devices 110-120 may each include a processor and a computer readable medium coupled to the processor, the computer readable medium comprising code, executable by the processor. In some embodiments, the IoT devices 110-120 may be coupled to a database and may include any hardware, software, other logic, or combination of the preceding for servicing user interactions including communication and transaction requests to one or more other IoT devices.

Messages between the computers, networks, and devices may be transmitted using secure communications protocols such as, but not limited to, File Transfer Protocol (FTP); HyperText Transfer Protocol (HTTP); Secure Hypertext Transfer Protocol (HTTPS); Secure Socket Layer (SSL); ISO (e.g., ISO 8583) and/or the like.

In embodiments, an application of automobile 118 of the second federated network 124 may attempt to communicate with the smart refrigerator 112 of the first federated network 122. In embodiments, the second registrar 128 may query the processing network registrar 106 for the addressing information for the first registrar 126. In various embodiments, the trust management system 102 may maintain addressing information for each member (i.e., federated network of computer resources) in the open trust network 100. Further, the trust management system 102 and processing network registrar 106 may proliferate polices that establish a minimum level of signatures or votes required before trust can be established between two members. To return to the example, the first registrar 126 may identify that the communication request from the second registrar 128 has never been established (e.g., a communication from a previously unknown entity within the open trust network 100).

In embodiments, a policy may be selected based on whether the communicating entity has previously been encountered or is a new contact. To illustrate, the first registrar 126 may apply a policy that requires that the EID associated with the automobile 118 application be signed or voted on by three other members (not pictured) in the open trust network 100 before trust can be established. As described herein, the EID may be associated or include information that can be utilized by the first registrar 126 to determine who has signed the EID and what their relative weight is with respect to their provided signature or vote. Assuming that the automobile 118 application's EID or credential includes the appropriate amount and weight of signatures, the first registrar 126 may provide a confirmation prompt or query to a user of the smart refrigerator 112 to verify the communication request from the automobile 118 application. Further, the second registrar 128 may provide a similar query to a user of the automobile 118 application inquiring that someone has provided their associated EID to establish communication with another IoT device (i.e., smart refrigerator 112). Upon receiving confirmation, the first registrar 126 may update its contact records, and request and/or generate a token that includes the appropriate signaling information to enable communication between the automobile 118 application and the smart refrigerator 112. In various embodiments, token generation and provision information may be performed by the first registrar 126, second registrar 128, and/or the processing network registrar 106.

Figure 2:
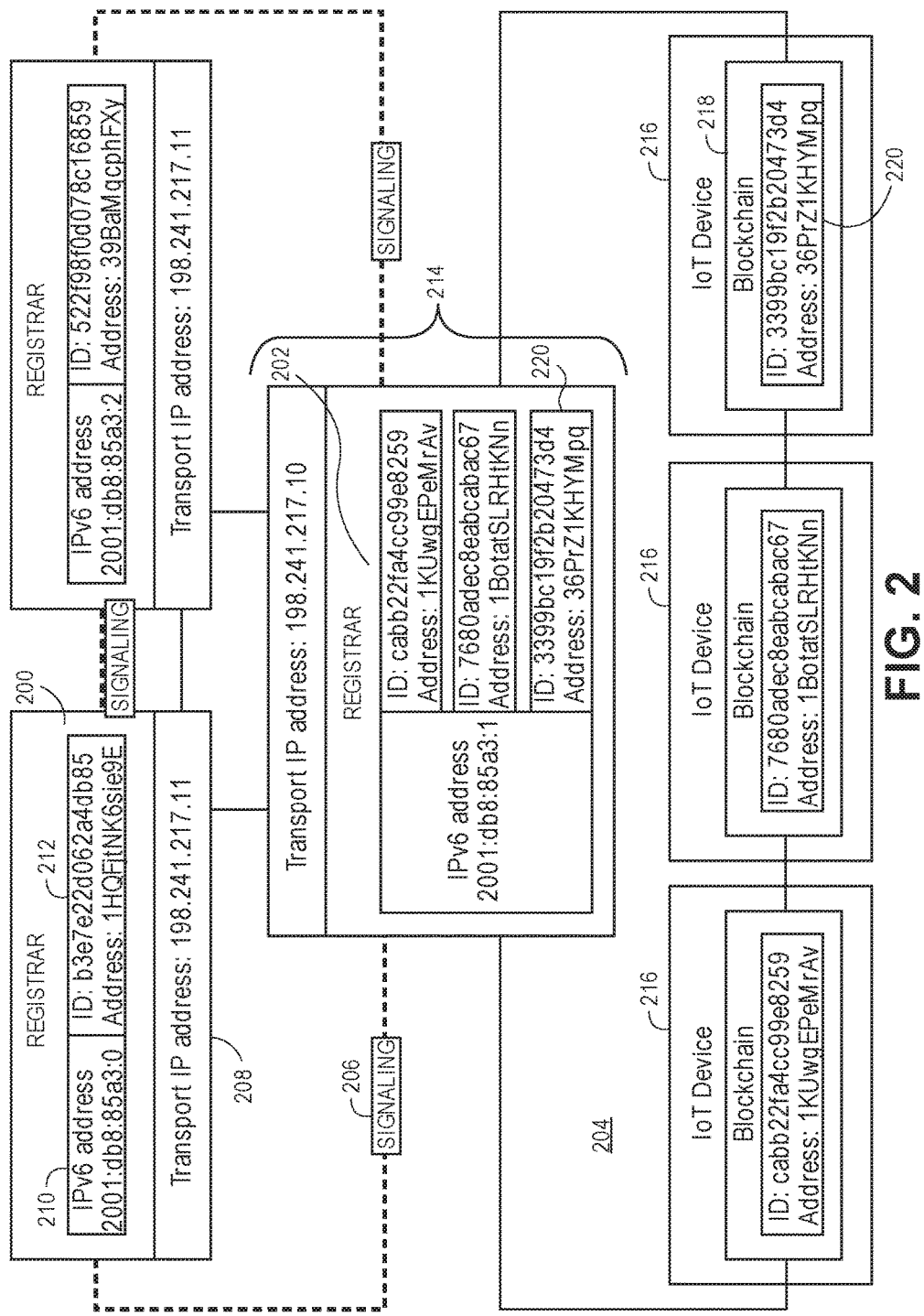
FIG. 2 depicts a block diagram of a hierarchical addressing scheme to enable signaling between registrars.

FIG. 2 depicts a block diagram of a hierarchical addressing scheme to enable signaling between registrars. FIG. 2 includes several registrars 200, 202, that are associated with respective IoT devices that make up a federated network of computing devices, such as federated network 204. The dashed lines in FIG. 2 represent the signaling pathways 206 and/or communication lines between registrars in an open trust network that enable secure connections between IoT devices belonging to different as of yet untrusted federated networks of computing devices. The registrar 200 includes a transport IP address 208, an IPV6 address 210, and an ID and local address 212 that represents a hierarchical address scheme that follows the canonical address format. In embodiments, the transport IP address can be utilized to communicate between registrars 200 and 202. In some embodiments, the IPV6 address represents a federated network address 210 that represents the federated network of computing devices. In embodiments, the transport IP address and/or the IPV6 address may be utilized to locate and communicate a registrar in the open trust network. It should be noted that although the addresses depicted in FIG. 2 include IPV6 addresses, IPV4 addresses and any other suitable internet protocol address may be utilized in generating addresses for the registrars, devices, applications, and related API services.

As described herein, the registrar 200 may maintain a mapping of local device identifiers and addresses 212. In embodiments, the registrar 200 may generate and assigned local device identifiers and addresses 212 to protect security and adhere to the canonical address format. In other embodiments, the federated network address 210 may serve as the locator address and all subsequent requests for a device of an associated federated network of computing devices may query the federated network address 210. For example, a request could be processed by registrar 200 from another registrar 202, by receiving and interpreting a request for an associated IoT device by processing the request to the IPV6 address 210. In some embodiments, the request, transaction request, or communication may be parsed, such decrypting a received token, to establish communication between two IoT devices belonging to different federated networks of computing devices. In embodiments, the local identifier and address 212 may be provided, via the registrar 212, to registrar 202 so that a direct secure connection can be established. In other embodiments, the generated local identifier and address 212 may be provided and mapped be provided to maintain privacy and security of IoT devices by the registrar. Thus, incoming requests to a said address and identifier may be mapped to an actual local ID and address by the registrar 200 to locate an appropriate IoT device and/or application.

FIG. 2 includes registrar 202 which includes a hierarchical addressing scheme 214 that represents multiple IoT devices 216 that correspond to a federated network of computing devices 204. As depicted in FIG. 2, the IoT devices 216 utilize a block chain voting structure 218 to make decisions, such as trusting requests from other IoT devices. As noted herein, each federated network of computing devices in the open trust network may utilize their own voting structure without affecting the voting structure of another federated network of computing devices. As illustrated in FIG. 2, the registrar 202 maintains a mapping of a device identifier and address 220. As IoT devices 216 are added or removed from federated network 204, the mapping of registrar 202 may be updated to add more addresses or remove addresses. In embodiments, the hierarchical addressing scheme 214 may represent an organized path from a top node address (transport IP, IPV6 address) to lower address nodes (device ID, application ID, etc.,). The use of the hierarchy address scheme 214 may prevent overflow and reuse of addresses that need to serve as unique addresses for location purposes. As members join or are added to the open network the scalable nature of the hierarchical addressing scheme can prevent memory over usage and confusion between locating a particular entity. As described herein, the registrars 200 and 202 may generate and assign the device identifiers and application addresses 212, 220 utilizing a hashing procedure or an encryption procedure that utilizes a public-private key pair provided by the trust management system.

Figure 3:
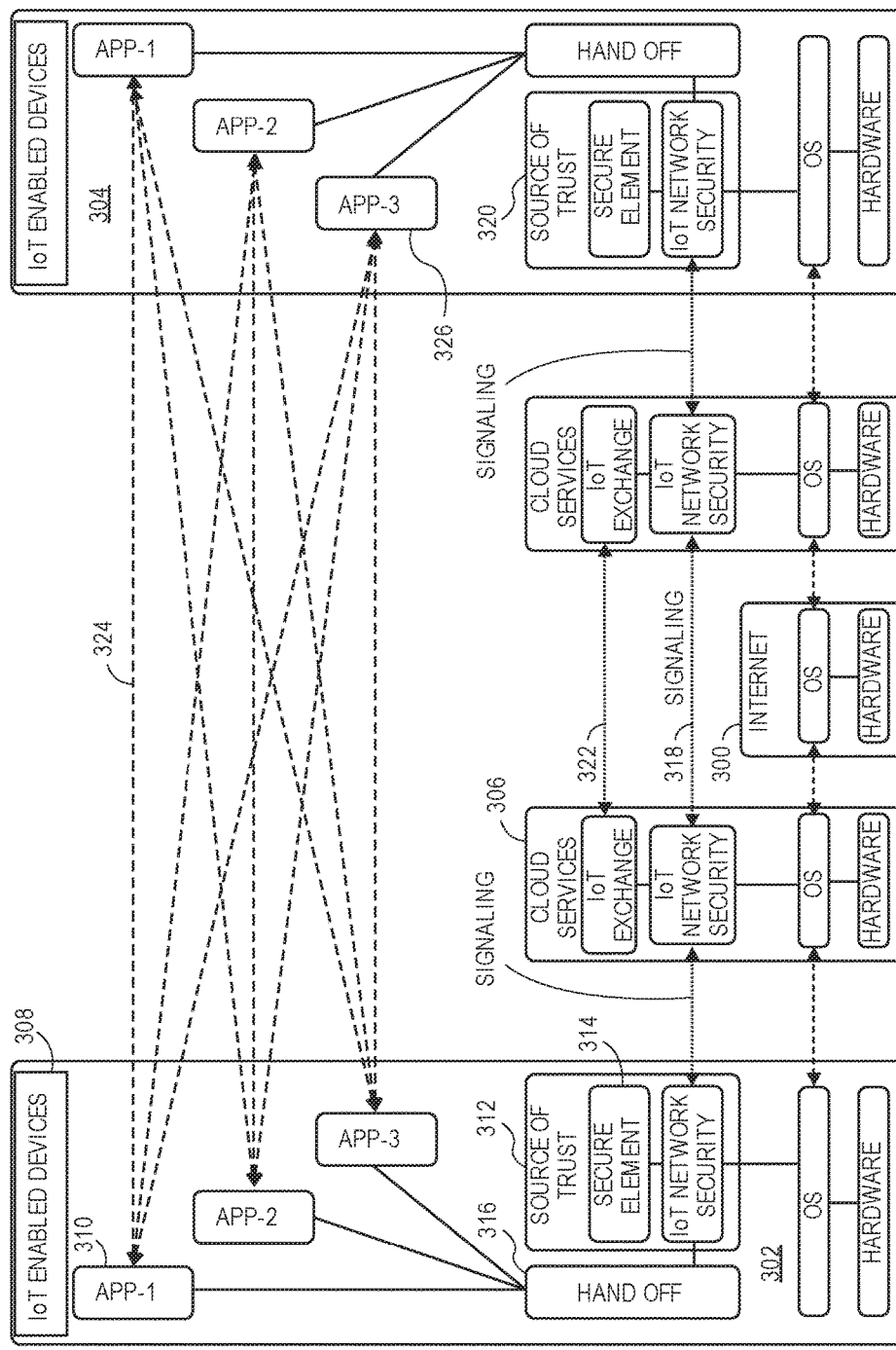
FIG. 3 depicts a block diagram of a system and signaling flow according to embodiments of the current disclosure.

FIG. 3 depicts a block diagram of a system and signaling flow according to embodiments of the current disclosure. FIG. 3 includes an architecture for implementing an open trust network as described herein. The architecture includes a communication network 300 such as the internet which may be provided by an internet provider that utilizes an operating system and corresponding hardware to implement the communication network 300. Each federated network of computing devices 302 and 304 may be implemented or associated with cloud services 306 that include an IoT exchange and IoT network security for enabling security and communication between IoT devices within a federated network. The cloud services 306 may include virtual instances, software, and hardware, to implement the details depicted in FIG. 3 such as an operating system and corresponding hardware (processors, software modules, memory, and computer storage). A federated network of computing devices, such as 302, may include several components including one or more IoT enabled devices 308, one or more applications 310, a source of trust 312 with a corresponding secure element 314 and a handoff mechanism 316. In embodiments, the source of trust 312 may be utilized to authenticate IoT enabled devices 308 within the federated network 302 and to vote to trust other federated networks of computing devices (304). For example, the source of trust 312 may implement a block-chain voting structure for the IoT enabled devices 308 to enable a vote to determine whether to trust or verify a communication request from federated network 304. In some embodiments, the source of trust 312 may include a secure element 314 for generating and maintaining one or more tokens for verification within its own federated network (302) and for providing tokens containing location information to other federated networks (304). In embodiments, the source of trust 312 and secure element 314 may represent a registrar such as registrar 126 (FIG. 1). In embodiments, the secure element 314 and source of trust 312 may maintain one or more policies for determining voting structures, verifying communications, generating addresses, and tokens. The handoff mechanism 316 may be configured to process communication requests from trusted members in the open trust network. For example, a transformation procedure may need to occur when a communication request is processed as a public (trusted) facing address may not correspond to an actual device identifier or application identifier as described herein. The handoff mechanism 316 may perform the transformation and process the request to the appropriate IoT enabled device 308 and/or application 310. Such procedures may also be performed by the registrars described herein. In some embodiments, the IoT enabled devices 308 may be configured to run or be associated with one or more software applications or API services 310.

FIG. 3 also includes signaling 318 that occurs between sources of trust 312 and 320 upon the federated networks 302 and 304 establishing trust as described herein. In the architecture depicted in FIG. 3, the cloud services 306 implementing or associated with federated network 302 may perform an IoT exchange 322 between federated networks 302 and 304 once trust has been established. In embodiments, the IoT exchange 322 may include sharing device identifiers and application addresses to update respective mapping and information for each cloud service 306. In some embodiments, the IoT exchange 322 merely shares the information required for communication between the IoT devices establishing a connection as to ensure security and privacy of other associated IoT devices 308 of a federated network 302. In embodiments, once trust has been established between the federated networks of computing devices 302 and 304, signaling 324 may occur between applications 310 and 326 and IoT devices associated with each federated network 302 and 304. As described herein, a token may be generated and provided by source of trust 320 to source of trust 312 for use in establishing a secure connection between applications 310 and 326 of federated networks 302 and 304 respectively. Thus, IoT devices residing in different federated networks of computing devices are enabled to locate and communicate with each other despite the IoT devices being of a different type or the applications lacking support to communicate with other applications. The canonical address format proliferated in the open trust network establishes a protocol for communicating between applications 310 and 326 and thus the signaling 324 can occur to conduct transactions for items, services, or access to data or a secure area.

Figure 4:
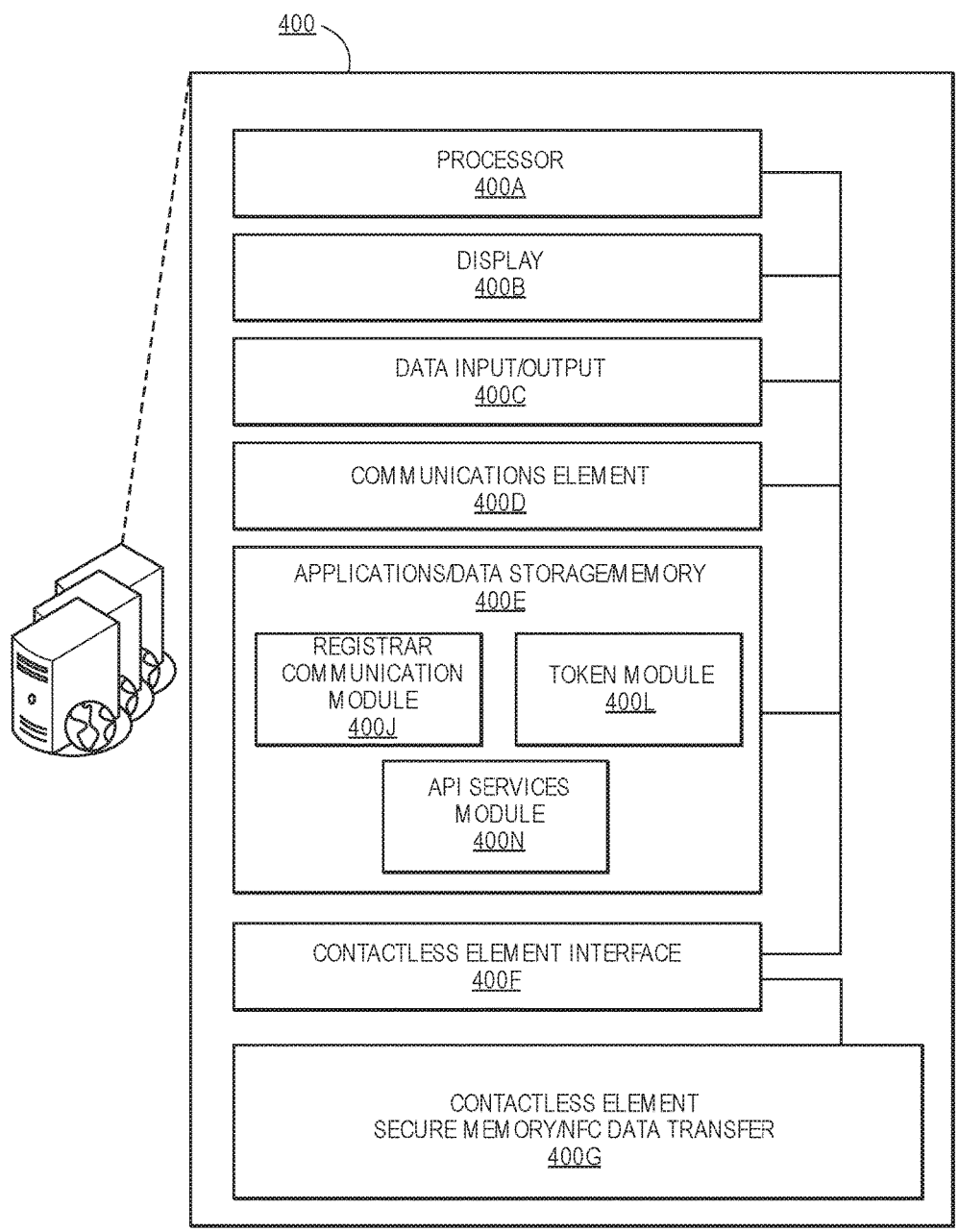
FIG. 4 depicts an exemplary registrar according to embodiments of the current disclosure.

An example of a registrar implementing features described herein, according to some embodiments of the invention, is shown in FIG. 4. Registrar 400 may include circuitry that is used to enable certain device functions, such as processing trust requests, communication requests, generating and maintaining address information for IoT devices and associated applications, and generating and providing tokens with location information and/or for authentication purposes as described herein. The functional elements responsible for enabling those functions may include a processor 400A that can execute instructions that implement the functions and operations of the device. Processor 400A may access memory 400E (or another suitable data storage region or element) to retrieve instructions or data used in executing the instructions, such as provisioning scripts and applications. Data input/output elements 400C, such as a hand held device, joystick, haptic sensors, motion sensors, a keyboard, a mouse, or other haptic input devices, may be used to enable a user to operate an IoT device in communication with registrar 400 (e.g., confirmation of purchase, initiate a transaction, or provide personal authentication information).

Data input/output elements 400C may also be configured to output data via an associated IoT device. Display 400B may also be used to output data to a user. Communications element 400D may be used to enable data transfer between registrars, IoT devices, applications and/or API services of devices that are located in different federated networks of computing devices, and other entities associated with transactions such as a processing network, resource provider computers, or an issuer computer. Registrar 400 may also include contactless element interface 400F to enable data transfer between contactless element 400G and other elements of the registrar 400, where contactless element 400G may include a secure memory and a near field communications data transfer element (or another form of short range communications technology). In embodiments, a registrar 400 may be implemented in a mobile device and maintain the distributed relationship in the open trust network.

The memory 400E may comprise a registrar communication module 400J, a token module 400L, API services module 400N, and any other suitable module or data. The registrar 400 may have any number of applications or modules installed or stored on the memory 400E and is not limited to that shown in FIG. 4. The memory 400E may also comprise code, executable by the processor 400A for implementing methods described herein. As used herein, a "module" may include a software module, a hardware module, or any suitable combination of software and hardware to implement the techniques described herein.

The registrar communication module 400J may, in conjunction with the processor 400A, may enable establishing trust between registrars in an open trust network, and generate and maintain one or more addresses for locating an associated IoT devices or an associated application/API. The registrar communication module 300J and API services module 400N, and the processor 400A, may be configured to communicate with one or more outside services or entities including resource provider computers, a processing network, or other suitable entity for authenticating the transaction as described herein. In some embodiments, the registrar communication module 400J and API services module 400N, in conjunction with the processor 400A, may be configured to communicate with a trust management system to update the registrar 400 addresses, member information, maintained tokens, or other suitable information as described herein.

In some embodiments, the token module 400L may, in conjunction with the processor 400A, be configured to maintain and generate one or more tokens for authenticating a device within an associated federated network of computing devices or for establishing trust and communication with other federated networks, IoT devices, and or applications. In embodiments, an entity may be considered to be untrusted when an associated token, credential, or EID is modified, compromised, or lacks the required signatures and/or votes from other participating entities. In embodiments, the token module 400L and API services module 400N may, in conjunction with the processor 400A, be configured to communicate with the another registrar, another IoT devices, and/or an application or API service to establish a secure connection to conduct communication or a transaction. In some embodiments, in order to increase security, tokens may not be stored at the registrar 400. Instead, the tokens can be temporarily retrieved from a remote server or cloud server when a communication and/or transaction request is being performed. In embodiments, the tokens may be generated and provided by the trust management system. In some embodiments, the token module 400L may store and utilize one or more private-public key pairs to sign and or encrypt the generated and provided tokens. In some embodiments, the API services module 400N and processor 400A may be enabled to process communication requests between applications of different federated networks by performing a mapping lookup of addresses and identifiers maintained by the registrar communication module 400J and registrar 400.

FIG. 4 depicts a diagram illustrating an example technique for authenticating a federated network of computing devices in an open trust network and establishing a connection between devices residing in different federated networks of computing devices according to embodiments of the current disclosure. The order in which the operations are described is not intended to be construed as a limitation, and any number of the described operations can be omitted or combined in any order and/or in parallel to implement this process and any other processes described herein.

Some or all of the process 500 (or any other processes described herein, or variations and/or combinations thereof) may be performed under the control of one or more computer systems configured with executable instructions and may be implemented as code (e.g., executable instructions, one or more computer programs, or one or more applications). In accordance with at least one embodiment, the process 500 of FIG. 5 may be performed by at least the one or more computer systems including trust management system 102, processing network registrar 106, first registrar 126, IoT devices 110-114, second registrar 128, and IoT devices 116-120 (FIG. 1). The code may be stored on a computer-readable storage medium, for example, in the form of a computer program including a plurality of instructions executable by one or more processors. The computer-readable storage medium may be non-transitory. The trust management computer system 502, first registrar computer 504, first computing device 506, second registrar computer 508 and second computer device 510 may all be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

The process 500 may include receiving, by a first registrar computer 504, a communication request from a first computing device 506 at 512. The communication request from the first computing device 506 may be attempting to trust and communicate with second computing device 510. The process 500 may include first registrar computer 504 requesting whether second computing device 510 is a trusted member of the open trust network and the location information for the second registrar computer 508 from the trust management system computer 502. The determination of trust between members may be processed by the trust management system computer 502 by conducting a vote of all members in the open trust network as described herein (including first registrar computer 504). The process 500 may include the trust management system computer 502 conducting the vote to determine the establishment of trust between the first registrar computer 504 and second registrar computer 508 at 516.

The process 500 may include the trust management system computer 502 indicating to the first registrar computer 504 that the second registrar computer 508 is a trusted member of the open trust network at 518. In embodiments, such an indication may include providing a digitally signed token or other piece of data that includes the location information for the second registrar computer 508 and second computing device 510. The process 500 may include the first registrar computer 504 establishing communication with the second registrar computer 508 at 520. In embodiments, the first registrar computer 504 may generate and provide a token with location information for the first computing device 506 or associated applications/API services to second registrar computer 508 to establish communication between different federated networks of computing devices. As described herein, the token may contain the canonical address for properly locating the second computer device and an associated application/API according to the canonical address format proliferated by the trust management system and maintained by each registrar computer 504 and 508. The process 500 may conclude at 522 by establishing a secure connection between the first computer device 506 and the second computer device 510 utilizing the provided token.

Figure 5:
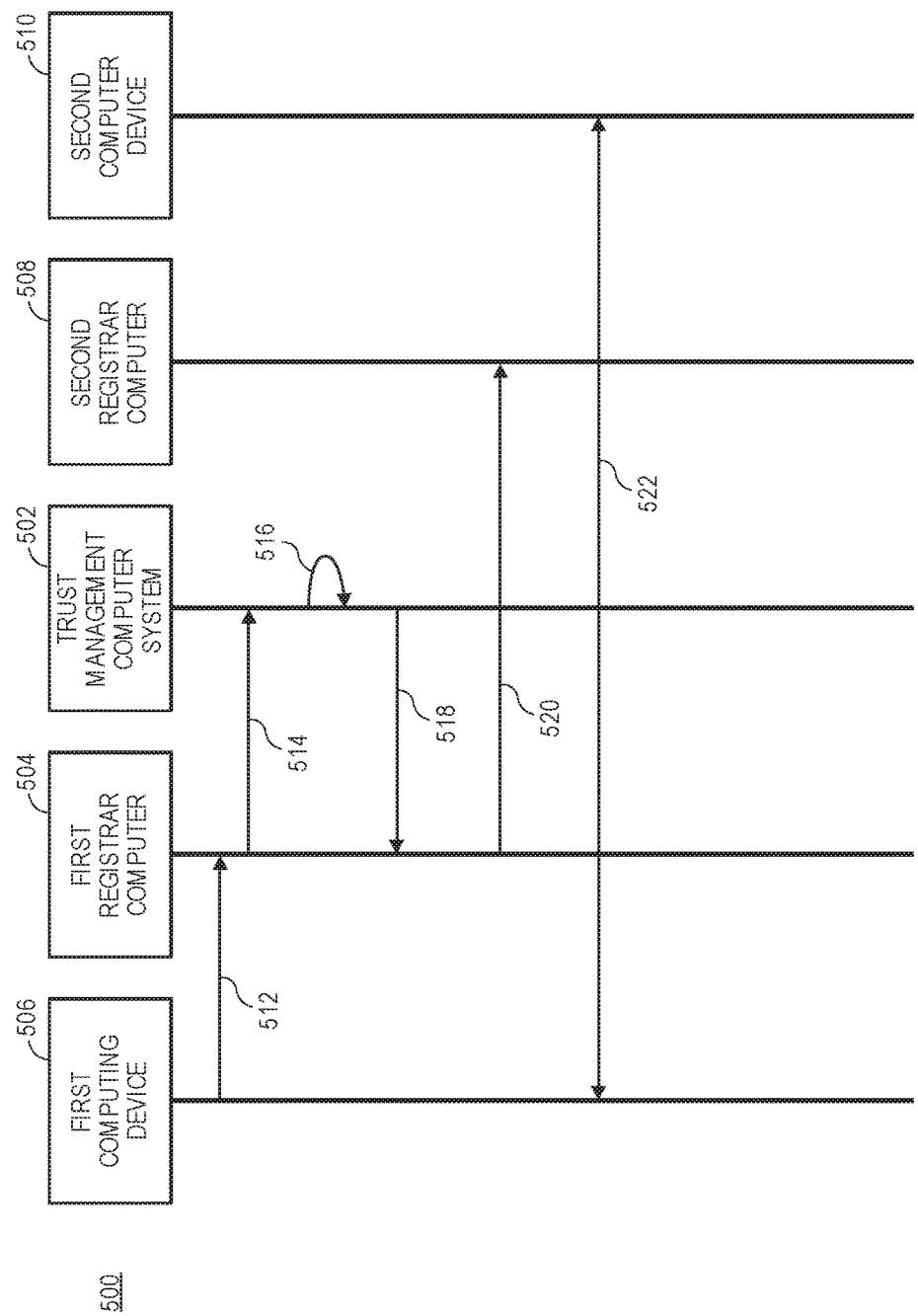
FIG. 5 depicts a diagram illustrating an example technique for authenticating a federated network of computing devices in an open trust network and establishing a connection between devices residing in different federated networks of computing devices according to embodiments of the current disclosure.

In embodiments where transactions are conducted upon establishing trust and a secure connection, the flow of FIG. 5 may include a transaction processing computer which may be disposed between a transport computer and an issuer computer (not shown). The transaction processing computer may include data processing subsystems, networks, and operations used to support and deliver authorization services, exception file services, and clearing and settlement services. For example, the transaction processing computer may comprise a server coupled to a network interface (e.g., by an external communication interface), and databases of information. The process 500 may include the transport computer requesting authorization of the transaction via the transaction processing computer. The process 500 may include the transaction processing computer providing an authorization response message to a resource provider computer (not shown). In some embodiments, the resource provider computer may proceed with completing the transaction upon receiving the authorization response message.

In some embodiments, the issuer computer may issue and manage a payment account and an associated payment device of a user. The issuer computer may be able authorize transactions that involve the payment account. Before authorizing a transaction, the issuer computer may authenticate payment credentials received in the authorization request, and check that there is available credit or funds in an associated payment account. The issuer computer may also receive and/or determine a risk level associated with the transaction, and may weigh the risk when deciding whether or not to authorize the transaction. If the issuer computer receives an authorization request that includes a payment token, the issuer computer may be able to de-tokenize the payment token in order to obtain the associated payment credentials.

As described herein, a computer system may be used to implement any of the entities or components described above. The subsystems of a computer system may be interconnected via a system bus. Additional subsystems such as a printer, keyboard, fixed disk (or other memory comprising computer readable media), monitor, which is coupled to display adapter, and others are also included in embodiments described herein. Peripherals and input/output (I/O) devices, which may be coupled to an I/O controller (which can be a processor or other suitable controller), can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk of the computer system may embody a computer readable medium. In some embodiments, the monitor may be a touch sensitive display screen.

A computer system can include a plurality of the same components or subsystems, e.g., connected together by an external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A computer-implemented method, comprising:
receiving, by a processor associated with a trust management system, a communication request from a first computing device of a first federated network of computing devices, the communication request identifying a second computing device of a second federated network of computing devices, the communication request utilizing a first address that is public facing with respect to non-trusted members of an open trust network;
determining, by the processor, that the second federated network of computing devices is a trusted member of the open trust network based in part on input provided by a plurality of federated networks of the open trust network and the first federated network of computing devices;
requesting, by the processor, a token from a first registrar associated with the first federated network of computing devices, the token including a unique application program interface address associated with the first computing device;
providing, by the processor, the token to a second registrar associated with the second federated network of computing devices;
identifying, by the processor, a second address that is a local address utilized within the plurality of federated networks of the open trust network based at least in part on the token, the second address being a private address that is utilized by trusted members of the open trust network; and
establishing, by the processor, a secure connection between the first computing device and the second computing device utilizing the token and the second address.

2. The computer-implemented method of claim 1, wherein the communication request identifies the second federated network of computing devices utilizing a canonical address format.

3. The computer-implemented method of claim 1, wherein a trusted member of the open trust network utilizes at least one of a block chain voting structure, a tree voting structure, or a hybrid voting structure.

4. The computer-implemented method of claim 1, wherein each trusted member of the open trust network has a certain weighted vote to determine the trust of a particular federated network of computing devices.

5. The computer-implemented method of claim 1, wherein the communication request includes a query for an application programming interface for a particular program associated with the second computing device.

6. The computer-implemented method of claim 5, further comprising adding the second federated network of computing devices to the open trust network.

7. A computer-implemented method, comprising:
receiving, by a registrar computer system associated with a federated network of computing devices, registration information for one or more application programming interfaces, the registration information received by the registrar computer system using a local address that is used by trusted members within the federated network of computing devices;
generating, by the registrar computer system, a unique address for each application programming interface included in the registration information;
generating, by the registrar computer system, a token confirming the registration of the one or more application programming interfaces, the token identifying a trust relationship within the federated network of computing devices;
receiving, by the registrar computer system, a request for the token from another registrar computer system, the request including a canonical address for a particular application programming interface of the one or more application programming interfaces; and
providing, by the registrar computer system, the token to establish a secure connection with the federated network of computing devices.

8. The computer-implemented method of claim 7, wherein the federated network of computing devices comprises one or more of a mobile computing device, a wearable device, a laptop computer, a desktop computer, a server computer, or an automobile.

9. The computer-implemented method of claim 7, further comprising updating, by the registrar computer system, a mapping of tokens to a plurality of application programming interfaces associated with a plurality of federated networks of computing devices based in part on input provided by the plurality of federated networks of computing devices.

10. The computer-implemented method of claim 9, wherein the input identifies membership in an open trust network.

11. The computer-implemented method of claim 7, wherein the canonical address for the particular application programming interface includes an Internet Protocol version six (IPV6) address.

12. The computer-implemented method of claim 7, wherein the canonical address for the particular application programming interface is determined based in part on hashing a local address associated with a computing device corresponding to the particular application programming interface.

13. The computer-implemented method of claim 7, wherein the request includes a unique transport address that is associated with the registrar computer system.

14. The computer-implemented method of claim 7, wherein confirming the registration of the one or more programming interfaces includes utilizing a policy for authenticating a computing device associated with at least one of the one or more programming interfaces.

15. A server computer, comprising:
a processor; and
a memory including instructions that, when executed with the processor, cause the server computer to, at least:
receive, by the processor, a communication request from a first computing
device of a first federated network of computing devices, the communication request identifying a second computing device of a second federated network of computing devices, the communication request utilizing a first address that is public facing with respect to non-trusted members of an open trust network;
determine, by the processor, that the second federated network of computing devices is a trusted member of the open trust network based in part on input provided by a plurality of federated networks of the open trust network and the first federated network of computing devices;

request, by the processor, a token from a first registrar associated with the first federated network of computing devices, the token including a unique application program interface address associated with the first computing device;

provide, by the processor, the token to a second registrar associated with the second federated network of computing devices; and identify, by the processor, a second address that is a local address utilized within the plurality of federated networks of the open trust network based at least in part on the token, the second address being a private address that is utilized by trusted members of the open trust network.

16. The server computer of claim 15, wherein the instructions, when executed with the processor further cause the server computer to:

receive, by the processor and from a third registrar associated with a third federated network of computing devices, a request to join the open trust network; and validate, by the processor, the third registrar and the third federated network of computing devices based in part on input from members of the open trust network.

17. The server computer of claim 16, wherein the instructions, when executed with the processor further cause the server computer to provide, by the processor, information identifying the first registrar and the second registrar.

18. The server computer of claim 15, wherein the token is configured to establish a secure connection between the first computing device and the second computing device utilizing the token.

19. The server computer of claim 15, wherein each trusted member of the open trust network has a certain weighted vote to determine the trust of a particular federated network of computing devices.

20. The server computer of claim 15, wherein the unique application program interface address associated with the first computing device is a canonical address that includes an Internet Protocol version six (IPV6) address.

* * * * *